United States Patent
Idesawa et al.

(10) Patent No.: US 7,570,275 B2
(45) Date of Patent: Aug. 4, 2009

(54) IMAGE INFORMATION DISPLAYING APPARATUS

(75) Inventors: Masanori Idesawa, Saitama (JP); Eiji Miyazaki, Tokyo (JP); Toyomi Fujita, Tokyo (JP)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 11/500,845

(22) Filed: Aug. 8, 2006

(65) Prior Publication Data

US 2006/0268008 A1 Nov. 30, 2006

Related U.S. Application Data

(63) Continuation of application No. 10/451,324, filed as application No. PCT/JP01/09309 on Oct. 24, 2001, now Pat. No. 7,142,191.

(51) Int. Cl.
*G09G 5/00* (2006.01)

(52) U.S. Cl. .................... 345/684; 345/156; 345/179; 715/784; 715/864

(58) Field of Classification Search ................ None
See application file for complete search history.

(56) References Cited

U.S. PATENT DOCUMENTS

| | | | | |
|---|---|---|---|---|
| 4,985,762 A * | 1/1991 | Smith | ........................ | 348/39 |
| 5,526,481 A | 6/1996 | Parks et al. | ................. | 715/784 |
| 5,714,972 A | 2/1998 | Tanaka et al. | ............... | 345/156 |
| 5,831,614 A * | 11/1998 | Tognazzini et al. | ......... | 715/784 |
| 5,880,974 A | 3/1999 | Tarumi et al. | | |
| 6,084,647 A | 7/2000 | Hatano et al. | | |
| 6,330,009 B1 | 12/2001 | Murasaki et al. | ............ | 715/784 |
| 6,411,275 B1 | 6/2002 | Hedberg | ...................... | 345/156 |
| 6,466,198 B1 | 10/2002 | Feinstein | ..................... | 345/158 |
| 6,778,768 B2 | 8/2004 | Ohkawara et al. | ............. | 396/55 |
| 6,798,429 B2 | 9/2004 | Bradski | ...................... | 345/156 |
| 6,834,249 B2 * | 12/2004 | Orchard | ...................... | 702/141 |
| 6,954,223 B2 | 10/2005 | Miyazawa et al. | ........... | 348/51 |
| 7,388,221 B2 * | 6/2008 | Lapstun et al. | .............. | 250/566 |
| 2001/0015753 A1 | 8/2001 | Myers | ......................... | 348/51 |

FOREIGN PATENT DOCUMENTS

| | | |
|---|---|---|
| JP | 7-271505 | 10/1995 |
| JP | 9-171569 | 6/1997 |
| JP | 10-153771 | 6/1998 |
| JP | 10-333821 | 12/1998 |
| JP | 2001-251403 | 9/2001 |

* cited by examiner

*Primary Examiner*—Kee M Tung
*Assistant Examiner*—David H Chu
(74) *Attorney, Agent, or Firm*—Frommer Lawrence & Haug LLP; William S. Frommer; Paul A. Levy

(57) ABSTRACT

This invention is relative to an image information display apparatus in which a large-sized image can readily be recognized even with use of a small-sized display unit such as is provided in a portable telephone set or in a mobile computer.

It is assumed that an observer (user) 122 is about to recognize an image of a larger size 121 using an image information display apparatus 124 having a display 123 of a smaller size. When the observer 122 moves his or her hand 126, a partial area 125 of an image demonstrated in the display 123 is actively changed. This permits the image of a larger size 121 to be comprehended readily in its entirety. The image of a larger size 121 can readily be recognized by having the hand movement matched to the movement of the display image (partial area 125 of the image), based on perceptual characteristics of the human being.

13 Claims, 12 Drawing Sheets

IMAGE INFORMATION DISPLAYING APPARATUS

This application is a continuation of application Ser. No. 10/451,324, filed Jun. 20, 2003, now U.S. Pat. No. 7,142,191 which is a National Stage of International Application No. PCT/JP01/09309, filed Oct. 24, 2001.

BACKGROUND

1. Technical Field

This invention relates to an image information displaying apparatus for displaying an image. More particularly, it relates to an image information displaying apparatus suited for displaying an image with a larger data volume on an image format (display) of a smaller size.

2. Background Art

A small-sized information processing apparatus, such as a portable telephone set or a mobile computer, is finding widespread application. Even these small-sized apparatus are mostly designed to display the image information. For example, certain types of the portable telephone sets of recent years are designed to display a variety of the image information acquired over the Internet.

The image displayed in small-sized apparatus is increasing in capacity in keeping up with the increasing processing speed of the image processing hardware or a variety of communication speeds. The apparatus having a display device of a large image format, such as a desktop computer, has a screen of a larger size and hence is able to display a high definition image at a time. However, in a small-sized information processing apparatus, such as a portable telephone set or a mobile computer, the display screen is mostly of a small-sized format, so that an image of a large capacity cannot be demonstrated at a time. Of course, the image can be demonstrated at the cost of resolution. However, in this case, the value of the information displayed is impaired.

Such a technique consisting in splitting a large-sized image into plural small-sized images and in sequentially switching these small-sized images for display on a display device with a small image format, and such a technique which consists in a display device unilaterally scrolls and demonstrates the image information as if one is winding and simultaneously reading a roll, have so far been used. The Japanese Laying-Open Patent Publication H-7-13554 has disclosed a technique similar to the latter technique.

However, with the former technique, in which gridiron-like small-sized areas, obtained on subdivision, are demonstrated sequentially one-by-one, so that these small-sized areas cannot be correlated with one another and hence the entire structure can hardly be comprehended. Moreover, if difficulties have been met in the division into the small-sized areas, the crucial information is split and displayed portion-wise on separate display sites, thus presenting problems that the structure of the entire image can in this meaning not be comprehended at a glance. In the latter case, in which the large-sized image is scrolled in the up-and-down direction or in the left-and-right direction, there is raised no problem of splitting the boundary location. However, since the image flows unidirectionally, it is difficult to recognize which position in the entire image is assumed by the currently displayed position. Thus, if it is attempted to re-display the same position, the position cannot be found without marked difficulties.

Thus, a wide variety of image information displaying apparatus, in which a frame by which a partial image of the entire image can be viewed in the entire image is set and this frame can be scrolled based on the observer's intention. For example, in the Japanese Laying-Open Patent Publication 2000-29568, a trackball is mounted on the back surface of a portable information equipment having a display and the portable information equipment is adapted for being moved on a table. As a result of this movement, the frame for demonstrating the image therein is shifted in the up-and-down direction or in the left-and-right directions. In the Japanese Laying-Open Patent Publication H-8-263205, a ball for detecting the direction and the magnitude of the movement is arranged on the back surface of the portable information terminal, so that a partial image responsive to movement on the table of this portable information terminal is demonstrated on a display arranged on the upper surface of this terminal. In the Japanese Laying-Open Patent Publication H-5-241731, there is disclosed an arrangement in which a movement sensor and a rotation sensor are arranged on the back surface of the main body unit to detect the magnitude or direction of movement or rotation.

In the Japanese Laying-Open Patent Publication H-8-314629, a ball for detecting the movement direction on the table is similarly mounted on the back surface of a flat-plate-shaped casing, having a built-in display, or the trackball is mounted on the upper surface of the casing. This allows scrolling an image in keeping with the movement of the casing on the table or with hand movement when the casing is fixed on the table. As for scrolling the image demonstrated on the display by acting on for example a direction key provided on the casing arranged on the table, there is a corresponding disclosure in the Japanese Laying-Open Patent Publication H-7-271506.

However, in an apparatus in which a casing having a built-in display is moved on a table or in which the casing itself is fixed on the table and a pointing device mounted on the casing is moved to display a desired image portion in the large-sized image, the following problems are met.

(1) For installing the apparatus, a planar surface, such as a desk or a table of a certain height suitable for operations, is required. The result is that it is practically impossible to scroll and display a portion of a large-sized image in case a portable telephone set or the like lightweight portable information terminal is being moved.

(2) Next, manipulation on a desk is comparable to pasting a large-sized map on the desk to observe its portion with a microscope. Consequently, the technique of arranging a ball on the back surface of the casing and moving it on the desk for moving an image demonstrated on the display is like the conventional technique of employing a paper sheet representing an image and hence appears to be more friendly to the user. Nevertheless, the problems similar to those hitherto encountered are raised. That is, if the image is to be observed on the display provided on the casing, which is moved on a desk, the image portion lying closer to the observer on the desk can be observed comfortably, however, the image portion remote from the user can hardly be observed on the display comfortably, because the casing is then moved to a location remote from the observer. The image can be observed comfortably from a direction perpendicular thereto, however, if the display surface is moved to the side of the desk remote from the observer, it may be an occurrence that the image is lost from sight or the portion of the transparent material on the image frame surface reflects light to render the image less visible, especially in the case of a liquid crystal display.

In the Japanese Laying-Open Patent Publication 2000-66802, there is disclosed a technique in which a virtual image frame is arranged on the desk at right angles to the desk surface and a liquid crystal display unit is arranged on a universal arm, with the display unit being then moved to different positions on the virtual image frame for displaying corresponding image portions. In this technique, there is raised a similar problem that, if the virtual image frame is increased in size, the image cannot be observed minutely, unless the observer moves his or her body upwards or towards left and right, depending on the location of the shifted liquid crystal display unit. Moreover, since the liquid crystal display unit needs to be mounted to the foremost part of the universal arm, not only is the apparatus increased in size, but also the large-sized image can be observed only on a desk portion where such special device is mounted, with the consequence that the site of possible application of the inventive concept is limited more severely than if the casing is moved on the desk.

It is therefore an object of the present invention to provide an image information displaying apparatus in which a large sized image can be observed in any location, using an image information displaying apparatus having only a small-sized display unit, such as the display unit of a portable telephone set or a mobile computer.

SUMMARY OF THE INVENTION

In one aspect of the invention, an image information displaying apparatus includes (a) a casing of a size that can be held and operated by hand, (b) a display unit built into the casing for displaying an image, (c) a position sensor for detecting the spatial position of the casing, (d) an image information storage unit for storing the image information of an image size larger than an image size that permits display at a time on the display unit, (e) a display image range selection unit for selecting the partial image information of a display range that can be displayed at a time on the display unit from the image information stored in the image information storage unit, and for outputting the selected information to the display unit for display, and (f) a partial image information selection controller for moving the image selected by the display image range selection unit in a direction of the movement as selected by the position sensor.

That is, the casing of a size that permits holding and manipulation by hand is provided with a position sensor for detecting its spatial movement. There are also provided the display unit and the image information storage unit for storing the image information of an image size larger than an image size that permits display at a time on the display unit. From the image information of an image size larger than an image size that permits display at a time on the display unit, the partial image information of the display range that can be displayed at a time is selected for display by the display image range selection unit. By employing the partial image information selection controller, the image selected by the display image range selection unit is moved along the direction of movement as detected by the position sensor. When the user holds the casing by hand and actively moves it in an observation space, the partial image information displayed is moved, depending on the location to which the casing has been moved, thus allowing facilitated recognition of the large-sized image in its entirety.

In a another aspect of the invention, the position sensor of the image information displaying apparatus detects the movement by substituting two-dimensional movement for spatial movement of the casing. The partial image information selection controller moves the image selected by the display image range selection unit in relationship to the substituted two-dimensional movement.

That is, in the image information displaying apparatus the position sensor detects the movement by substituting two-dimensional movement for spatial movement of the casing. In this case, the partial image information selection controller two-dimensionally moves the image information selected by the partial image information selection controller in relationship to this substituted two-dimensional movement. For example, if the casing is halted by hand and moved in the left and right directions, the image information displayed is also moved in the left and right directions. However, should the casing be moved to approach to the eye, the image on the display unit is not moved by such three-dimensional movement (movement along Z-axis perpendicular to the XY plane). This allows the user to observe an image enlarged in size spontaneously as a result of the display unit approaching to the eye.

In another aspect of the invention, the position sensor in the image information displaying apparatus detects the movement by substituting three-dimensional movement for spatial movement of the casing. The partial image information selection controller moves the image selected by the display image range selection unit in relationship to the substituted three-dimensional movement.

That is, the position sensor in the image information display apparatus substitutes a three-dimensional movement for the spatial movement of the casing to detect the movement. In this case, the partial image information selection controller three-dimensionally moves the image information selected by the display image range selection unit in relationship to this substituted three-dimensional movement. For example, if the casing is halted by hand and moved in the left and right directions, the image information displayed is also moved in the left and right directions. However, should the casing be moved to approach to the eye, the image is moved in a direction along the height or depth of the casing as a result of this three-dimensional movement (movement along the Z-axis perpendicular to the XY plane). If the image information displaying apparatus, so far held in a horizontal position, is held in the vertical position for switching to the Z-axis to realize thereby the movement along the Z-axis, three-dimensional movement is possible with the use of the two-dimensional position sensor. By this technique, the structure of each floor of a building or the cross-section of the brain, for example, can be analyzed readily by an intuitive operation.

In another aspect of the invention, the image information storage unit in the image information displaying apparatus stores the image information downloaded over a communication network.

That is, the image information can be loaded to the image information storage unit, using the communication network, such as the Internet. By storing the various image information, primarily intended for the routine desktop computer, in the image information storage unit, and by the operator actively operating the image information displaying apparatus, an image of a larger size can be satisfactorily comprehended on the small-sized display unit. It is therefore unnecessary for the information purveyor to provide two distinct channels of the image information, namely the image information for a routine desktop computer and the image information for e.g. a portable telephone set with a small-sized display. It is also possible to overcome the problem of deteriorated resolution which may be encountered when an image is provided for the image information displaying apparatus with a small-sized display, such as a portable telephone set.

In another aspect of the invention, the partial image information selection controller of the image information displaying apparatus includes a point of origin coordinate data registration unit for registering the coordinate of a point of origin serving as a reference for a display frame in slicing a portion of the image information stored in the image information storage unit to the display unit for display thereon, and a selection instructing unit for causing the display image range selection unit to select sequentially the display range of the partial image determined by the display frame by sequentially changing the coordinate of the point of origin in relationship to the direction and the magnitude of spatial movement of the casing as detected by the position sensor.

That is, the partial image information selection controller displays the partial image of an image size that can be displayed at a time on the display unit, based on the point of origin moved in an amount corresponding to the spatial displacement of the casing as detected by the position sensor.

In another aspect of the invention, the image information displaying apparatus further includes a switch for on/off setting as to whether or not the spatial movement of the casing sequentially detected by the position sensor is to be reflected in registered contents of the point of origin coordinate data registration unit.

That is, if the switch in the casing in the image information displaying apparatus is selected so as not to reflect the spatial movement in the display, and subsequently changed over to reflect the spatial movement in the display, the effect as if the image information around the image information, that can be displayed by the movement of the user's arm, is pulled into the area which allows for display by the user's movement operation, may be achieved. It is also possible to shift an area of interest to a mid portion of the area where movement operation is possible, in order for the area of interest to be observed more readily.

In another aspect, the image information storage unit in the image information displaying apparatus is a memory in a computer.

In another aspect, the display image range selection unit in the image information displaying apparatus is implemented by a CPU and a memory in a computer and the functions of a computer software stored in the memory.

In another aspect, the partial image information selection controller is implemented by a CPU and a memory in a computer and the functions of a computer software stored in the memory.

In another aspect, the apparatus comprises a casing of a size that can be held and operated by hand, a display unit built into the casing for displaying an image;

a position sensor for detecting the spatial position of the casing;

a stereoscopic model information storage unit having the stereoscopic model information stored therein;

a two-dimensional image information outputting unit for changing an observing point in keeping with movement of the casing as detected by the position sensor to generate and output the two-dimensional image information which is based on the changed viewing point; and a display image range selection unit for selecting the partial image information of the display range that can be displayed at a time on the display unit to output the so selected partial image information for display on the display unit.

In another aspect, the two-dimensional image information outputting unit in the image information displaying apparatus generates and outputs an image for a right eye and an image for a left eye for stereoscopy. The display unit displays the image for a right eye and the image for a left eye in such a manner as to enable stereoscopy.

DETAILED DEXCRIPTION

A first embodiment of the present invention is now explained.

Figure 1:
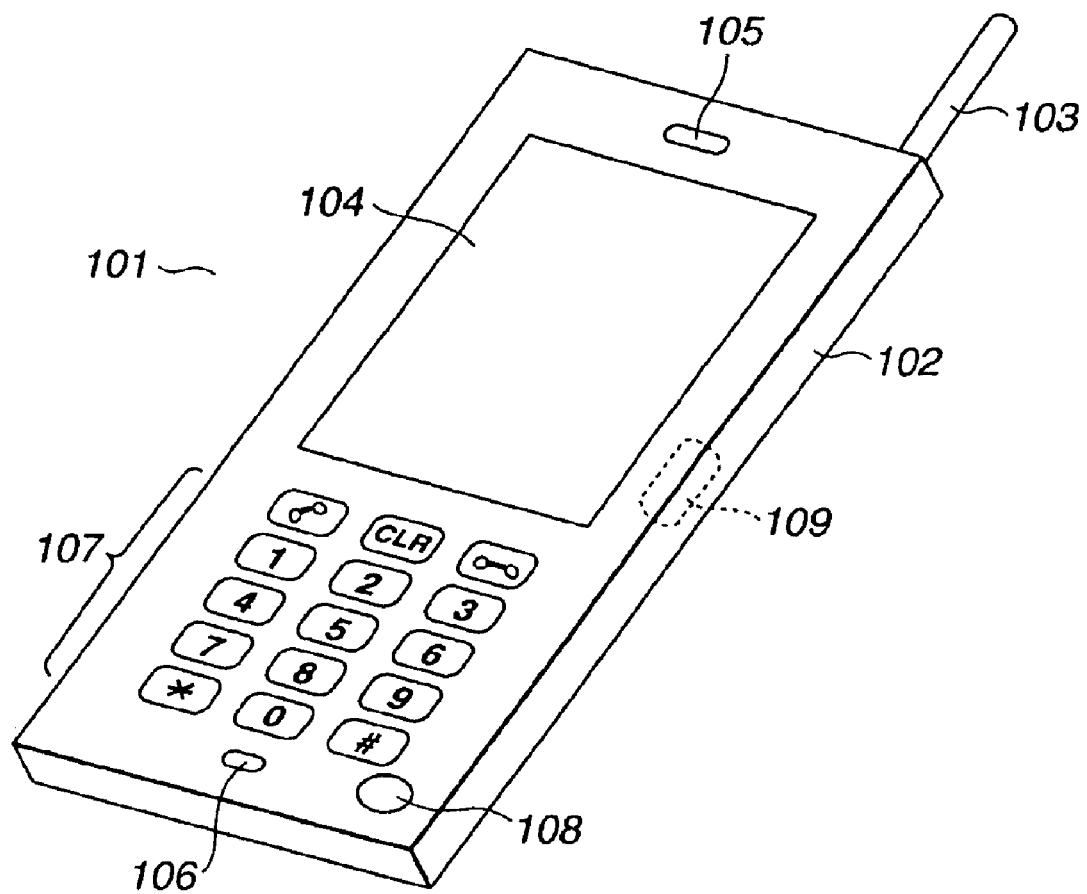
FIG. 1 is a perspective view showing the appearance of an image information display apparatus of a first embodiment of the present invention.

FIG. 1 shows an appearance of an image information displaying apparatus of the present first embodiment. This image information displaying apparatus of the portable telephone set type 101 includes a main body unit 102, as a casing, on an upper end of which is mounted an extensible antenna 103. On the front surface of the main body unit 102 of the apparatus is mounted a liquid crystal display 104 as a display unit. On the uppermost and lowermost portions of the front surface of the main body unit 102 are mounted a loudspeaker 105 and a microphone 106, respectively. An operating unit 107, composed of various button switches, is mounted between the liquid crystal display 104 and the microphone 106. A mode changeover switch 108 is mounted below the operating unit 107. This mode changeover switch 108 is used for a specified case of shifting an image of a large size, for example, as will be explained in detail subsequently. Of course, one of the pre-existing switches forming the operating unit 107 may be provided with a function similar to the function of this mode changeover switch 108.

Within the inside of the main body unit 102 is enclosed a position sensor 109 as a position detection unit. In the present embodiment, an acceleration sensor is used as this position sensor 109. The acceleration sensor is a device for detecting the acceleration along two or three axes when the image information displaying apparatus 101 is moved through the space in a hand-held state. The acceleration sensor is used for example in an air bag or as a controller for a gate device. The position sensor 109 of the present embodiment is an acceleration sensor for detecting the acceleration along two axes. Specifically, the position sensor detects components along the longitudinal and transverse directions of the acceleration acting on the main body unit 102 and executes integration of the respective components with respect to time to calculate the velocity and displacement components. However, the position sensor 109 of the present embodiment may be configured for calculating only one of the velocity and displacement components. In observing an image of a larger size, using the liquid crystal display 104 as an image frame of a size smaller than the image, the image information displaying apparatus 101 causes the image display area to be changed responsive to the movement of the main body unit 102 by exploiting the results of calculations by the position sensor 109.

The operation representative of the principle of the image information displaying apparatus 101 is now explained with reference to FIG. 2. In the following explanation, the reference numerals used are changed, because the drawing is simplified. First, it is assumed that (1) there exists an unknown image 121 of a larger size; and that
(2) an observer (user) 122 recognizes an image using an apparatus 124 having a display frame (display) 123 of a smaller size.

Under these conditions, the observer 122 is able to view only a partial area 125 of the image, displayed in the display frame 123, at a time. If the observer 122 moves his or her hand 126 to change the partial area 125 of the image displayed on the display frame 123, he or she is able to comprehend the entire image of the larger size 121 sooner or later. In the present instance, the image is an image of an [elephant]. However, the image may be any of a variety of images, such as a map or a photo. It has been indicated that not only the visual system but also the motor system, such as hand movements, has to do significantly with actual perception of the image of the larger size 121 which may be achieved by sequentially changing the partial image 125 of the image of the larger size. This point will be discussed below.

Figure 3:
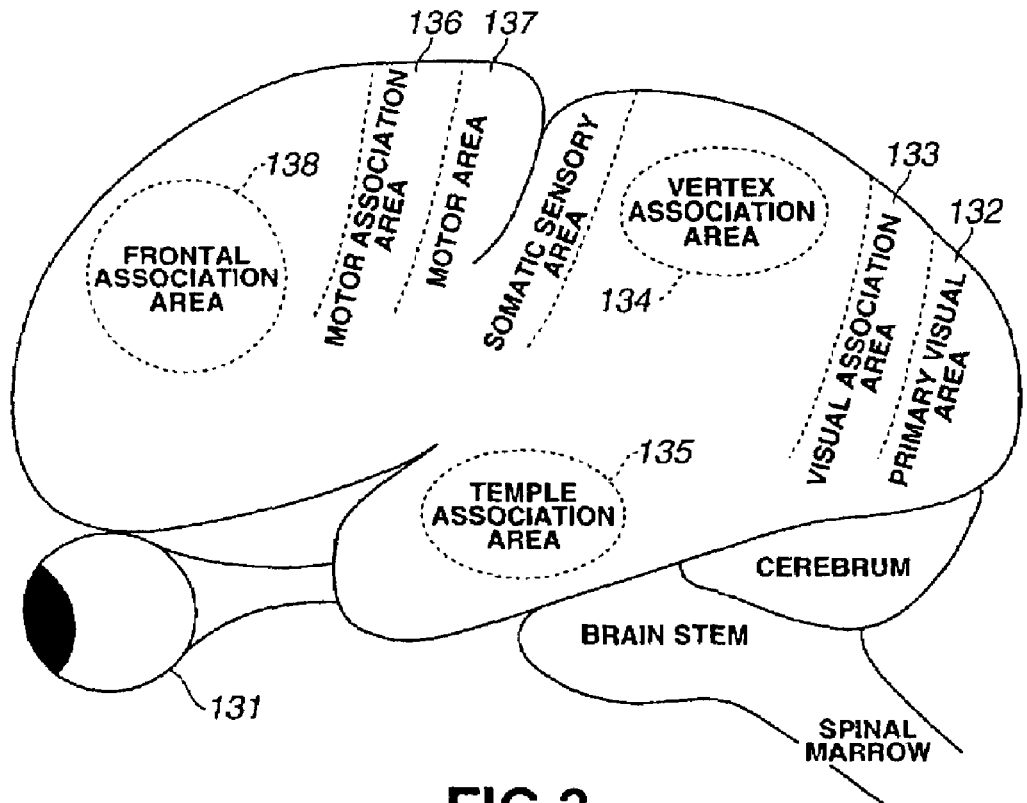
FIG. 3 illustrates the relationship between the motion and the information acquired from an eye in connection with the brain of the human being.

The relationship in the cerebrum of the human being between the information derived from the eye and the movement is explained with reference to FIG. 3. The image information, obtained in the eyeball 131, is transmitted to the cerebrum, and line elements or the colors are recognized by the primary sensory area 132, whilst the lines, shape and the color extent are recognized by the visual association area 133. The location and the size are recognized by the vertex association field 134, whilst the shape with attendant color is recognized by the temple association field 135. On the other hand, the motion planning is performed by the motor association field 136, while the command for movement, based on the so planned out movement, is issued by the motor field 137. The intention is formulated in the frontal association field 138.

Figure 2:
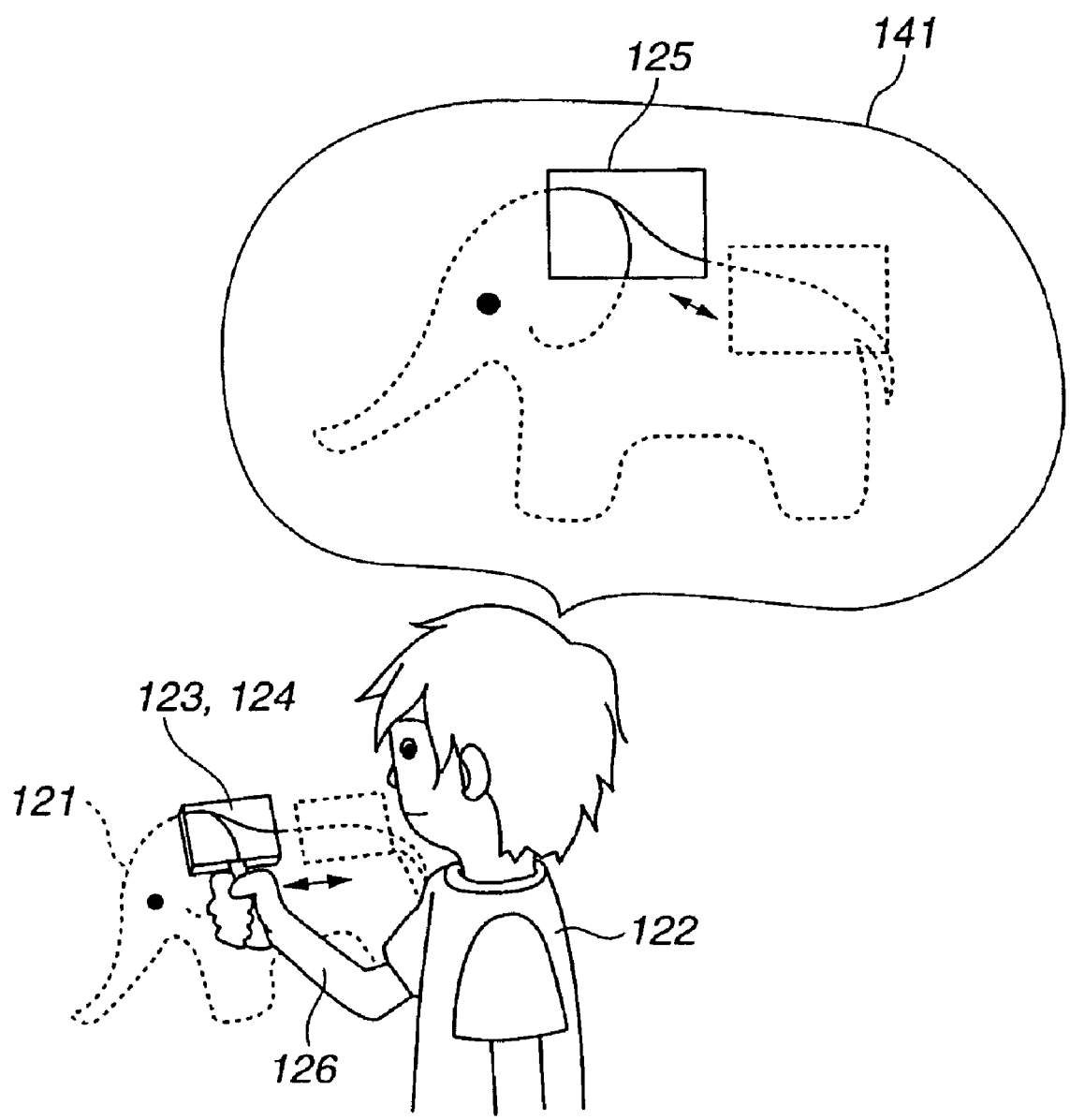
FIG. 2 illustrates the operation representative of a principle of the image information display apparatus of the first embodiment of the present invention.

If the unknown image of the larger size 121 shown in FIG. 2 is to be recognized, thought activities therefor are performed in the frontal association field 138. In the motor association field 136, the movement schedule by movement of the hand 126 is mapped out and the command for movement is issued by the motor field 137. The eyeball 131 captures changes in the image information by the movements of the hand 126 which are based on this command. The recognition activities by the primary visual area 132, temple association field 135 and the vertex association field 134 occur as changes in the visual information and the position information of the hand 126 are correlated with each other.

Figure 4:
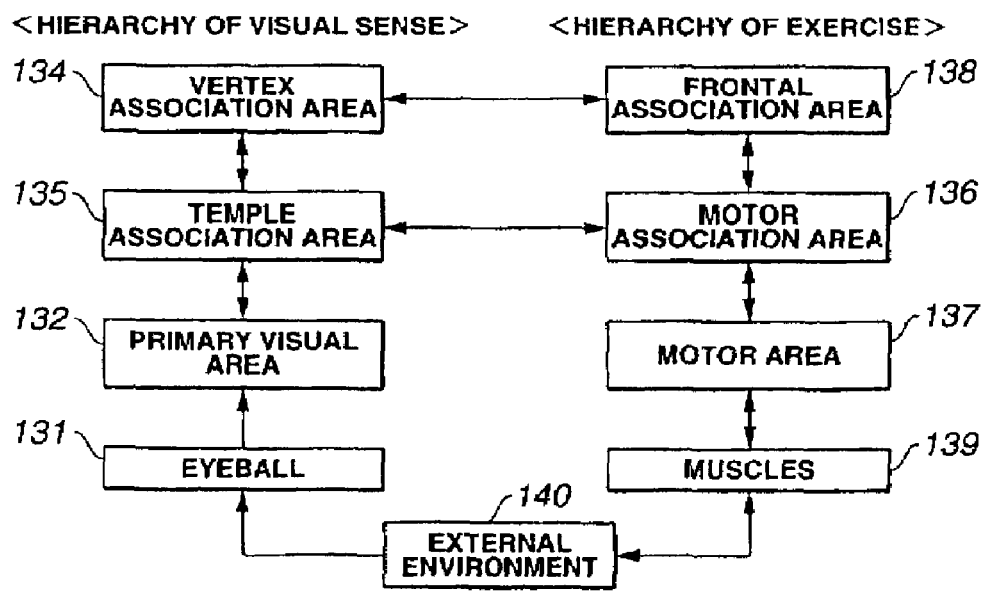
FIG. 4 illustrates the relationship between the hierarchical structure of the information processing of the visual system and that of the output of the motor system.

FIG. 4 shows the relationship between the hierarchical structure of the information processing by the visual system and that of the output of the motor system. The upper visual and motor hierarchical layers execute activities for efficient recognition of the image 121 by reciprocal information transmission. The premises for this are that the observer 122 positively exploits the motor system for the recognition of the image 121. The observer 122 holds geometrical position relationships of the image 121 as an entity to be recognized in his or her perceptual space and combines the sequentially presented partial areas 125 of the image by way of integration. The active and free hand or arm movements of the observer 122 are deeply concerned with the comprehension of the position relationships for this image integration. For grasping the position relationships for this image integration, the active free hand or arm movements of the observer 122 are involved significantly. The muscles 139 perform movements under the command from the motor area 137 for adaptation to an external environment 140. The eyeball 131 captures changes in the external environment 140. These changes are recognized by for example the primary visual area 132. The information processing by the visual system and the motor system occurs in concerted fashion among the hierarchical layers of the temple association field 135, motor association field 136, vertex association field 134 and the frontal association field 138.

Referring again to FIG. 2, the coordinated operation of the visual and motor systems is explained. In FIG. 2, the observer 122 actively moves the hand 126, and empirical data of position changes and the image information derived from the eyeball 131 as shown in FIG. 3 are used to draw the results of recognition of the image 121 in the perceptual space 141. Such cooperation between the visual system and the motor system has been recognized through observation of the active states in the various parts of the brain at the time of image training in which a trainee performs exercises as he or she envisions hitting a tennis ball with a racket.

However, the general way of thinking was that the human sensory system is merely passive. With this way of thinking, a third party unilaterally moves the display frame 123, instead of the observer 122 actively moving the hand 126. In this case, it is only sufficient that the observer 122 simply traces changes of the partial image demonstrated in the display frame 123 which is at the fixed position. In an extreme case, the necessity of moving the eyeball 131 (FIG. 3) is eliminated by making a contrivance in display control. However, with this passive technique, even though various body portions need not be moved, the visual system grasps the movement of the partial images, under a condition that the motor system is at a standstill. This holds true not only when the image is a moving image but also when the image is a still image, a phenomenon which can never occur in the real world. There is produced, in this manner, an unbalance between the motor system and the sensory system. As a result, the information acquired by the visual system is perturbed by the motor system, thus wastefully consuming a lot of time in delineating the results of recognition of the image 121 in the perceptual space 141.

In contradistinction from the conventional way of thinking in which the human sensory system is merely passive, a number of related art publications, including the aforementioned Japanese Laying-Open Patent Publication 2000-29568 disclose a technique in which a ball is mounted on the back surface of the main body unit of an apparatus having a built-in display and is adapted for being moved on a desk. The partial image is changed in a operatively concerted fashion with the movement of the main body unit of the apparatus. Even though these techniques have proposed changing the state of the observer 122 from passive to active, it has not been proposed by these techniques to operatively link the visual and motor systems. It is because the surface of a table placed horizontally is at a constant height level so that the perceptual space 141 formed in the observer's brain is forcibly replaced by a fixed position relationship comprising the depth-wise direction and the left and right direction on the desk surface. The same may be said of the technique shown in the publication of the Japanese Laying-Open Patent Publication 2000-66802 in which the plane perpendicular to the desk surface is to be a virtual image plane, and the technique in which a trackball is mounted on an upper surface of the main body unit of the apparatus having the built-in display and is adapted for being rotated by hand.

In the image information displaying apparatus 101 of the present embodiment, shown in FIG. 1, if the image 121 is a two-dimensional image, and the observer (user) 122 moves the main body unit 102 of the apparatus in the usual use state, that is as he or she holds the apparatus, the partial images may sequentially be displayed on the liquid crystal display 104 in keeping with the direction and the distance of movement of the main body unit 102. This may be understood from the fact that, in the case of the two-dimensional image, if the liquid crystal display 104 is approached to the eye of the user 122, the size (contraction ratio) itself of the partial image is not changed. For example, if desired to view a photo held by a user's hand in an enlarged size, he or she merely approaches the photo itself to his or her eye, while the image of the photo itself is not enlarged. That is, when the image 121 is a two-dimensional image, the position sensor 109 detects the movement of the main body unit 102 of the apparatus by the user as being a movement in a two-dimensional plane parallel to the image 121 (a quantity having the direction and the magnitude). The partial images, which are in agreement with the movement, are demonstrated on the liquid crystal display 104, as will be explained subsequently. Such changes of the partial images, brought about by the movement, are termed [image movement] in the present embodiment.

Figure 5:
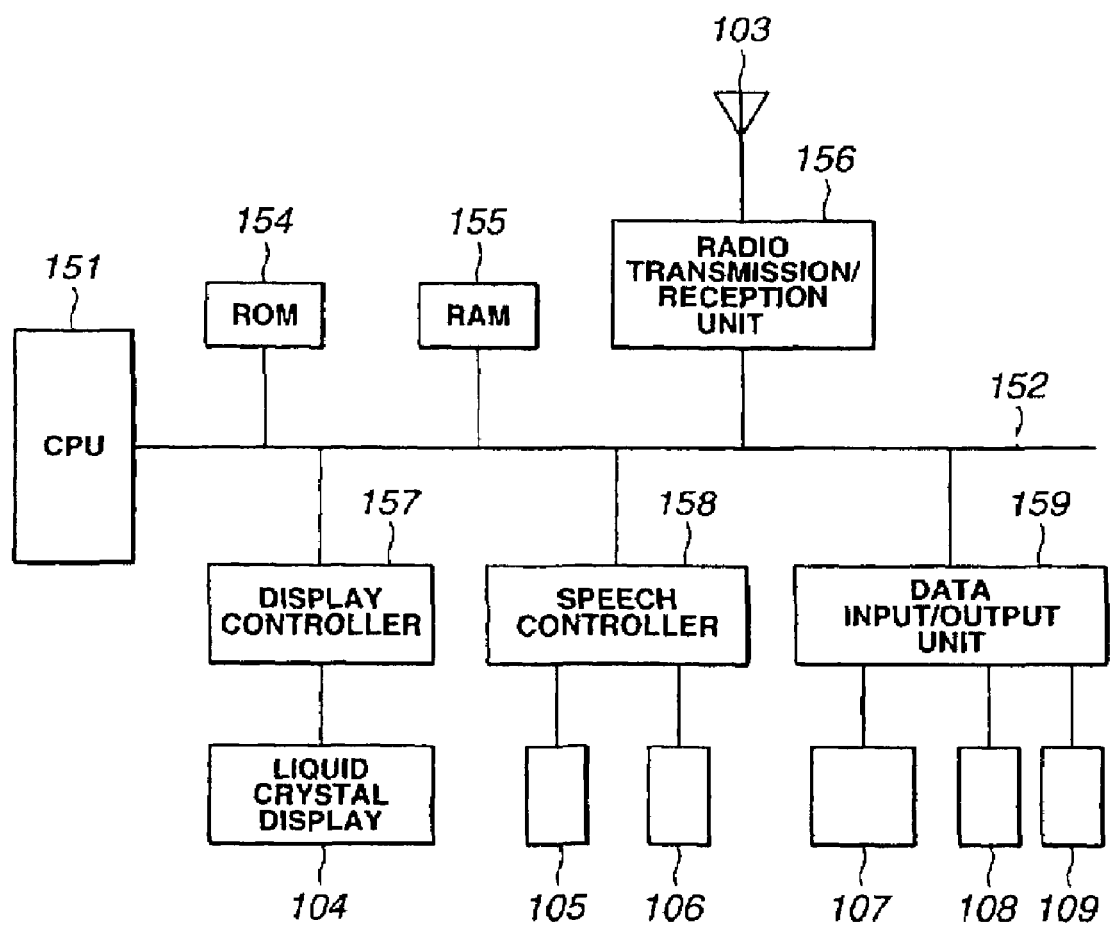
FIG. 5 is a block diagram showing schematics of a circuit structure of the image information display apparatus of the present embodiment.

FIG. 5 shows a schematic circuit structure of the image information displaying apparatus 101. This image information displaying apparatus 101 has a CPU (central processing unit) 151 loaded thereon. The CPU 151 is connected over a bus 152, such as a data bus, to various components in the image information displaying apparatus 101. Of these, a ROM 154 is a read-only memory having stored therein fixed data, such as a program for controlling various parts of the image information displaying apparatus 101. A RAM 155 is a random access memory of a larger capacity and includes, besides a storage area as a work memory in which to transiently store data necessary for executing programs, a memory area in which to download the image information and a display memory area in which to expand the downloaded image information for display. The image information, stored in the downloading memory area, is compressed in accordance with a preset format, in a majority of cases.

A radio transmission/reception unit 156 transmits/receives data over an antenna 103. A display controller 157 performs display control of the liquid crystal display 104. A speech controller 158 is connected to a loudspeaker 105 and a microphone 106 for inputting/outputting the speech and for amplifying speech signal, as an example. A data input/output unit 159 is connected to the operating unit 107, mode changeover switch 108 and to the position sensor 109 and is used for inputting the information on the pushing of the button switch and the information on the biaxial acceleration and for performing turn-on and display control of the operating unit 107 and the mode changeover switch 108.

Figure 6:
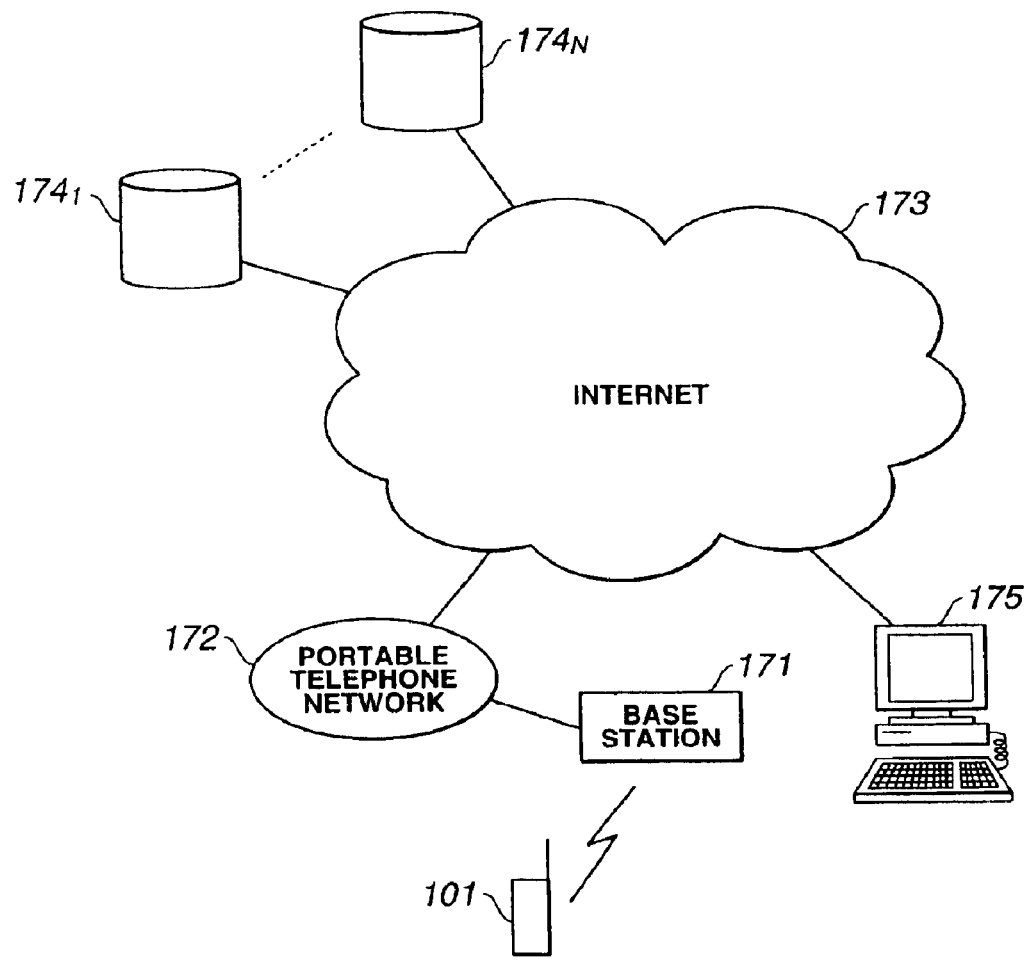
FIG. 6 shows schematics of a communication system for the image information employing the image information display apparatus of the present embodiment.

FIG. 6 shows schematics of a communication system for the image information employing an image information displaying apparatus of the present embodiment. In this communication system, the image information displaying apparatus 101 is connected over a base station 171 to a portable telephone network 172 for communication with another portable telephone set or a fixed telephone set, not shown. The portable telephone network 172 is also connected to the Internet system. Thus, the present embodiment of the image information displaying apparatus 101 is able to access various servers 1741 to 174N, connected to the Internet 173, in order to acquire various contents. In this respect, the image information displaying apparatus is in the same environment as a desktop personal computer 175 connected to the Internet 173.

It should be noted that, in the case of the desktop personal computer 175, described above, display units of a variety of sizes have been marketed, so that, by using these in any desirable combination or by adjusting the image resolution, the image information of a larger size may be demonstrated on one image frame, in a majority of cases. In the case of the portable telephone set or the portable personal computer, as in the present embodiment of the image information displaying apparatus 101, the display unit is of a small size, so that, if the image information of a larger size is acquired from any of the servers 1741 to 174N, display artifices are required for viewing the image information. These display artifices are now explained, taking an example of a case of downloading a map as the image information of a larger size and displaying the so downloaded map on the image information displaying apparatus 101.

Figure 7:
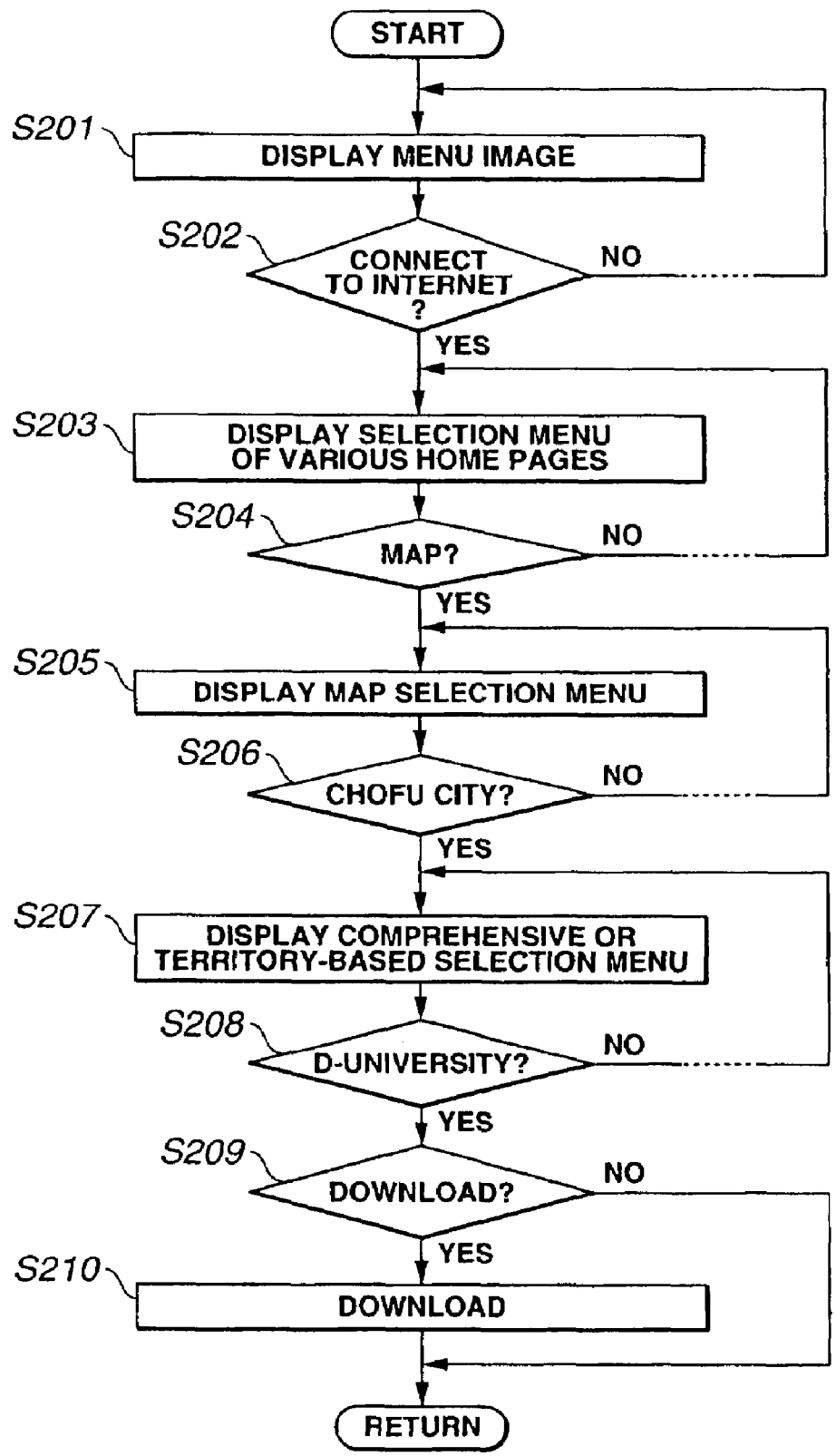
FIG. 7 is a flow diagram showing a processing flow in case connection is made to the Internet to download a desired map using the present embodiment of the image information display apparatus.

FIG. 7 depicts the processing flow in case the image information displaying apparatus of the present embodiment is connected to the Internet for downloading a desired map. This processing is carried out by a CPU 151 of FIG. 5 executing the program stored in a ROM 154. When a user turns on the power supply of the image information displaying apparatus 101, or presses a menu select button, not shown, of the operating unit 107, shown in FIG. 1, a menu image is displayed on the liquid crystal display 104 (step S201). On this menu image, there are displayed, on the item-by-item basis, a variety of processing operations that can be performed on this image information displaying apparatus 101. Since the apparatus is to be connected by the user to the Internet, the user selects an item [connect to Internet] (step S202:Y). This demonstrates a menu image, displaying a variety of home pages on the item-by-item basis, on the liquid crystal display 104 (step S203). If, in the step S201, an item other than [connect to Internet] is selected, the display is moved to an image for executing other item(s), such as registration of a telephone directory. Instead of the user selecting a desired one of pre-set home pages, the user may directly input the URL (Uniform Resource Locator) he or she desires to access.

It is now assumed that the user in a step S203 has selected, from various home pages, an item by which a map can be downloaded (step S204:Y). Then, a map selection menu is displayed on the liquid crystal display 104 (step S205). It is assumed that, from this menu, the user has selected Chofu-city, for example (step S205:Y). A map server 174N, as a relevant server, transmits to the image information displaying apparatus 101 the information pertinent to the selection menu for selecting Chofu city in its entirety or its specified area. The CPU 151 and the display controller 157 demonstrate the information on the liquid crystal display 104 (step S207). If the user is desirous to download the map of the campus of a D-University in Chofu city, he or she selects an item [D-University] (step S208:Y). If, in this state, the user selects its downloading (step S209:Y), the downloading of the map of the [D-University] is executed (step S210). It is noted that the selection of the size of data to be downloaded, the time and the fee, such as call accounting involved in the downloading of the map data of various sizes, may be demonstrated for downloading on the liquid crystal display 104.

The map data arrives at the image information displaying apparatus 101, from the map server 174N, shown in FIG. 6, via Internet 173, portable telephone network 172 and base station 171, so as to be stored in the aforementioned download memory area of the RAM 155, in the compressed transmitted state.

Figure 8:
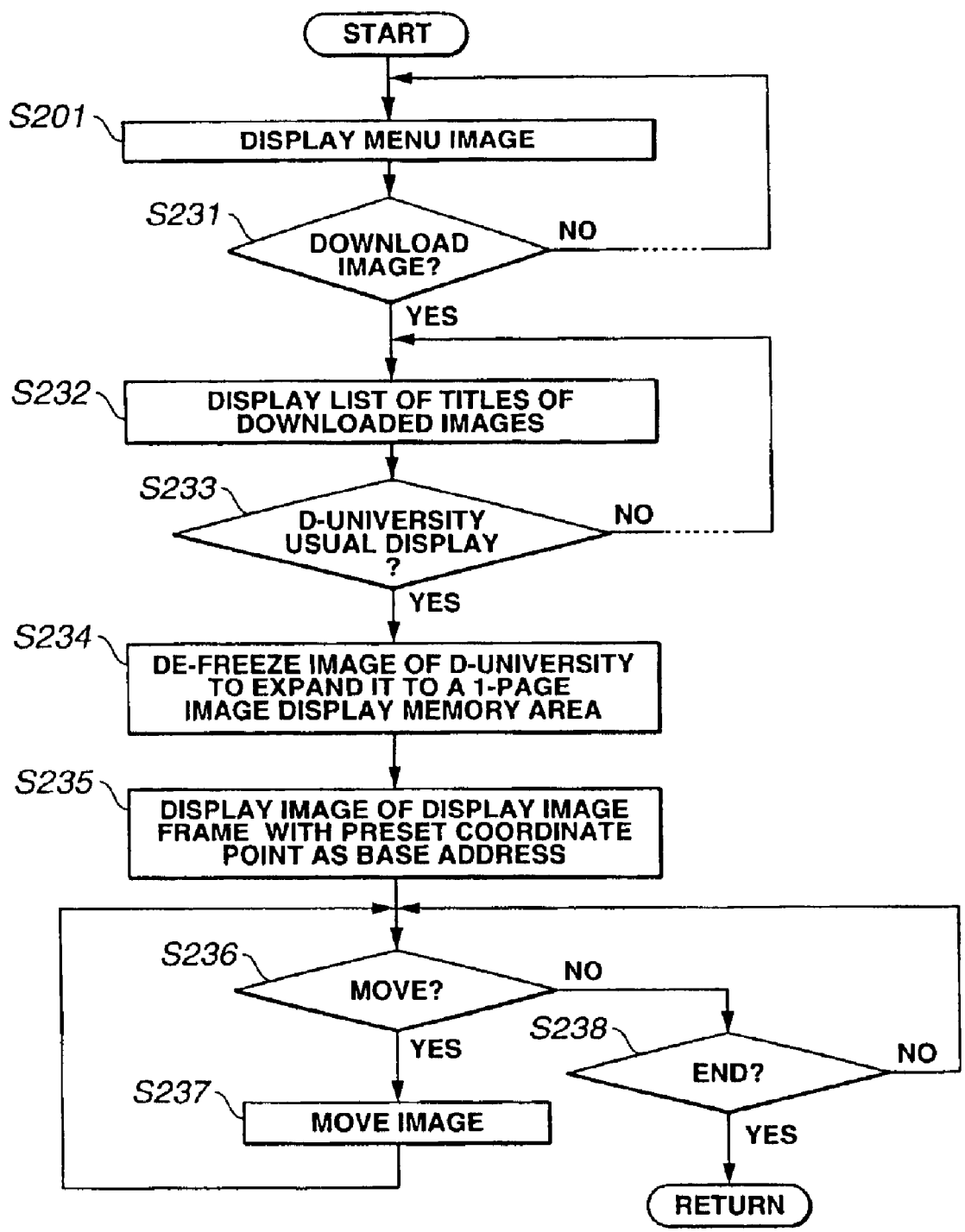
FIG. 8 is a flow diagram depicting the manner of display control in case an image of a larger size is displayed on the image information display apparatus in the present embodiment.

FIG. 8 shows the manner of display control in case the image of a larger size, such as a downloaded map, is demonstrated on the image information displaying apparatus. If the menu image is demonstrated in a step S201 of FIG. 7, the user selects an item [download image] in this case (step S231:Y). This demonstrates a list of titles of the downloaded image information on the liquid crystal display 104 of the image information displaying apparatus 101 (step S232).

Figure 9:
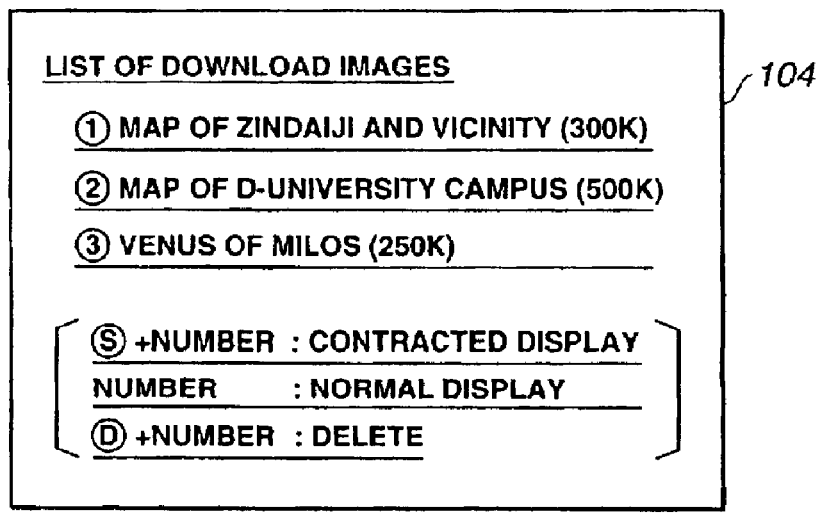
FIG. 9 is a plan view showing a typical image format of a liquid crystal display demonstrating a list of titles of the image information in the present embodiment.

FIG. 9 shows an example of an image of a liquid crystal display demonstrating a list of the titles of the image information. In the liquid crystal display 104, a list of the titles of the downloaded images, stored by the user in the downloading memory area of the RAM 155 as the [list of downloaded images], is displayed. If, as the mode changeover switch 108 (see FIG. 1) is pressed, the user inputs a desired number, using a ten-key, not shown, of the operating unit 107, the downloaded image information of the relevant number, is displayed to a contracted size corresponding to the display frame of the liquid crystal display 104. If only the number is entered, usual display is made, as now explained. If both a [D] button switch, as a special button switch, not shown, of the operating unit 107, and the number, are input simultaneously, the image information of the number is deleted from the downloading memory area.

Referring again to FIG. 8, the explanation is now continued. If the user inputs to select the usual display of [D-University] (step S233:Y), the compressed downloaded image of the D-University is decompressed and expanded in a display memory area for demonstrating a one-page image (step S234). With the coordinate point (x, y) of the point of origin as the base address, only the display frame of the liquid crystal display 104 is sliced out and displayed (step S235). If the user then moves the image information displaying apparatus 101 (step S236:Y), the coordinate point of the point of origin (x, y) is moved in an amount corresponding to the variation of the coordinate (x, y), so that the slicing area of the image expanded on the display memory area is moved to display the image thus moved on the liquid crystal display 104 (step S237). This display control is continued until the user issues a command to terminate the display of the image information (step S238:Y).

If the contracted display shown in FIG. 9 is selected, the compressed relevant pixels are expanded and subsequently the number of pixels is diminished to a number corresponding to the size of the display frame of the liquid crystal display 104 to make the display. The line drawing information is likely to vanish depending on the pixel thinning-out process. In such case, it is sufficient to carry out well-known image processing of holding the line drawing information.

Meanwhile, there are two modes of moving the image demonstrated on the liquid crystal display 104, namely a mode in which, on detection of the movement of the main body unit of the apparatus 102 by the position sensor 109, the base address as the point of origin is moved in the X- or Y-direction by an integrated value of the movement, and a mode in which, as the mode changeover switch 108 keeps on to be pressed, the main body unit of the apparatus 102 is similarly moved, the pressing on the mode changeover switch 108 is released after the movement is stopped, and the area of the image information that can be displayed is shifted by the movement of the main body unit of the apparatus 102. The latter mode may be conceived as being the shifting of the coordinate system of the movement operating area by the user and the coordinate system of the image information, such as the map. That is, in the former mode, if the user moves the image information displaying apparatus 101 a preset distance towards right and subsequently moves the apparatus towards left the same distance to return the apparatus to the original position, the image demonstrated on the liquid crystal display 104 is initially moved towards right and then towards left until finally the image at the start point is again displayed. In the latter mode, if the image information displaying apparatus 101 is moved as the mode changeover switch 108 is thrust, the image area displayed is fixed and, if it is attempted to return the apparatus to its original position as the pressure on the mode changeover switch 108 is released, the base address itself is shifted in the direction of movement and by the amount of movement. Thus, if an image of a sufficient size cannot be demonstrated due to limitations imposed by for example the length of the user's arm, the necessary image area may be shifted, by acting on the mode changeover switch 108, within the area (range) where the image can be displayed by the operation of moving the image information displaying apparatus 102, thereby permitting the image to be demonstrated on the liquid crystal display 104.

Figure 10:
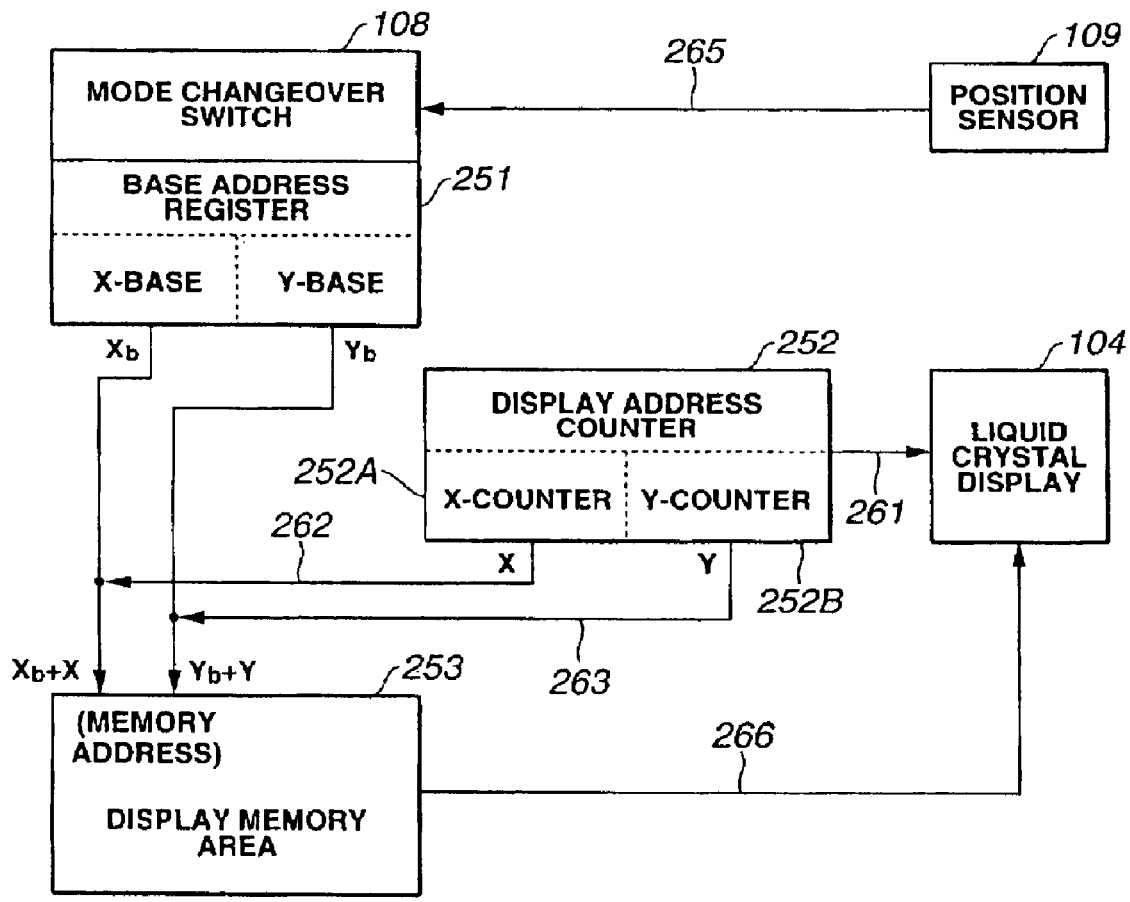
FIG. 10 is a block diagram showing a circuit portion performing image movement control and image display in the present embodiment.

FIG. 10 depicts a circuit portion responsible for image movement control and image display. This circuit portion is made up by the liquid crystal display 104, shown in FIG. 5, the mode changeover switch 108, the position sensor 109, a base address register (corresponding to point of origin coordinate data registration means) 251, a display address register (corresponding to selection command means) 252 ad a display memory area 253 forming a part of the aforementioned RAM 155 (see FIG. 5). The base address register 251 and the display address register 252 form a part of the display controller 157 shown in FIG. 5.

It is noted that the display address register 252 is a circuit for generating the X-coordinate information 262 and the Y-coordinate information 263, as the address information 261 indicating the scanning points (x, y) scanning the entire display area of the liquid crystal display 104. The display address register 252 includes an X-counter 252A and a Y-counter 252B adapted for counting by X-coordinate and Y-coordinate components of the movement information 265 output by the position sensor 109. The base address register 251 holds the X-base information Xb and the Y-base information Yb as a display base point of the liquid crystal display 104 in the display memory area 253.

In an initial state in which the mode changeover switch 108 is not pressed, the X-base information Xb and the Y-base information Yb stored in the base address register 251 are coincident with the point of origin of the display memory area 253 (such as a left lower corner point of the display memory area 253 shown in FIG. 10). If, in this state, the user moves the image information displaying apparatus as he or she holds the apparatus by hand, the X-base information Xb and the Y-base information Yb are changed in keeping with the displacement as detected by the position sensor 109. These changed values Xb, Yb are input to the base address register 251 so that the coordinate values of the point of origin can be changed. The as-changed coordinate values of the point of origin are used as the coordinate values of the point origin for determining the area to be sliced out from the display memory area 253. This area becomes an image read out to the liquid crystal display 104. By this operation, the image information read out from the display memory area 253 (the information of the partial image) 266 is changed responsive to the movement of the position sensor 109.

Figure 11:
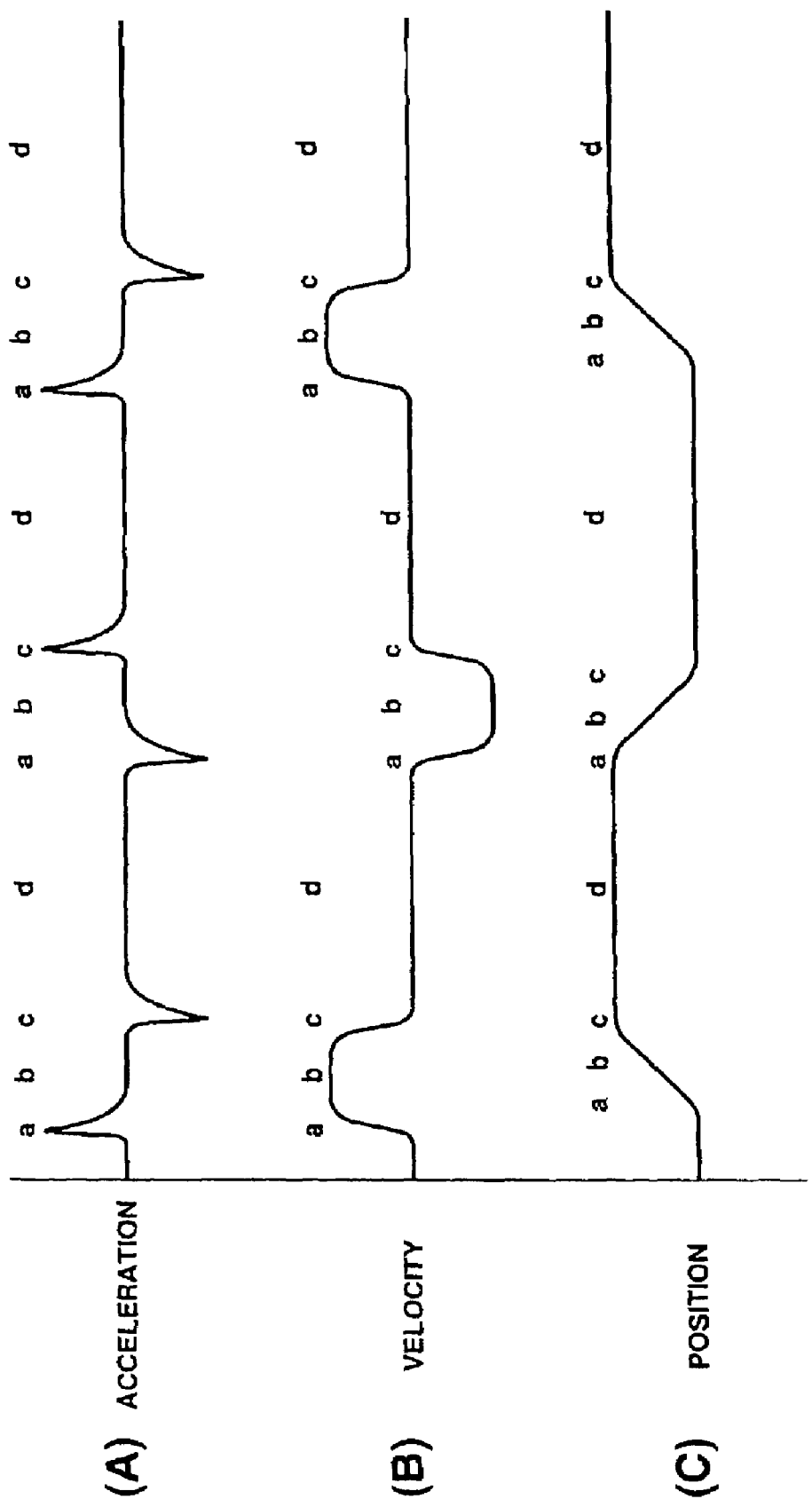
FIG. 11 is a graph showing an example of movement detection by a position sensor in the present embodiment taking the direction of the X-coordinate as an example.
Figure 12:
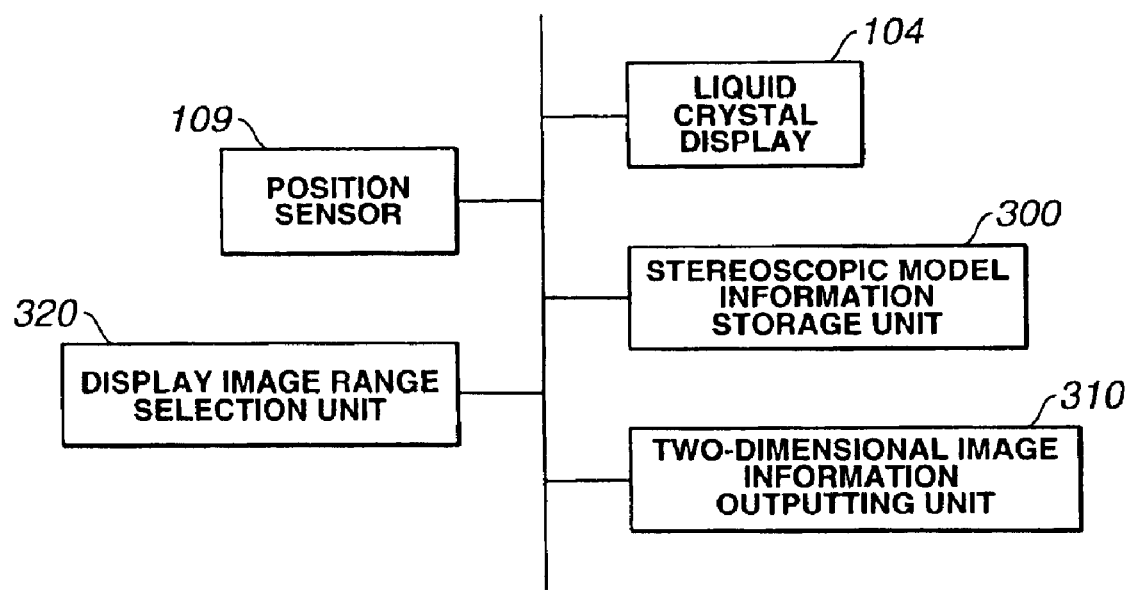
FIG. 12 is a block diagram showing the principal structure of a second embodiment of the present invention.
Figure 13:
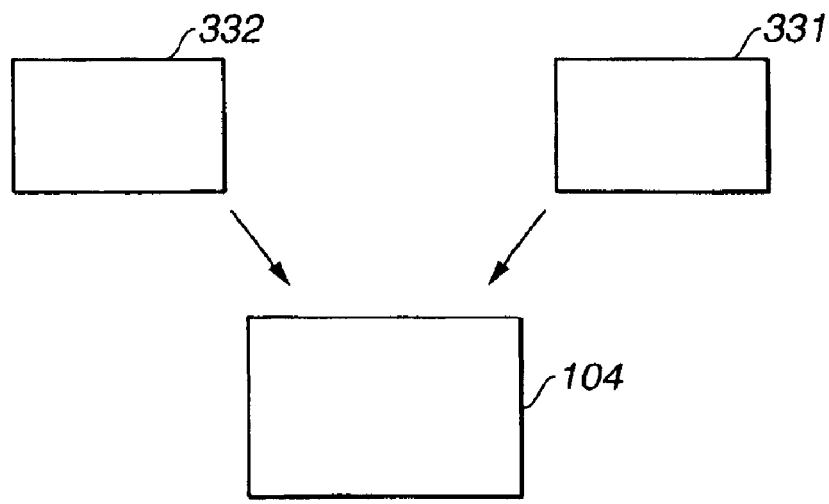
FIG. 13 is a diagrammatic view for illustrating the operation of generating and displaying two images for stereoscopy.

FIG. 11 shows an example of the movement detection by the position sensor taking the X-coordinate direction as an example. When an acceleration sensor is used as the position sensor 109 (FIG. 1), the main body unit of the apparatus 102 is accelerated (domain a) at the same time as the movement is commenced, as shown at (A) in FIG. 11. The main body unit of the apparatus 102 then is moved at a substantially constant speed, that is with a substantially zero acceleration (domain b), then decelerated (accelerated in the opposite direction) at a certain time point (domain c) and halted in its movement (domain d) until the start of the next movement. The above-described sequence of operations occurs repeatedly.

FIG. 11 shows in (B) the positive speed (forward movement) and the negative speed (backward movement) of the image information displaying apparatus 101 based on this information, as obtained from the acceleration sensor, while FIG. 11 (C) shows changes in the position along the X-coordinate direction of the image information displaying apparatus 101.

When an operator holds the image information displaying apparatus 101 with hand and actuates it sequentially, the operation is characterized by the usually longer time corresponding to the stop state indicated by the domain (d). Even during this halt time, the speed component as an integrated value of the acceleration is sometimes output, depending on the particular acceleration sensor used. In such case, the image demonstrated on the liquid crystal display 104 is moved, based on the velocity component, even though the apparatus remains halted. Thus, it is desirable to take such measures as determining the time period the apparatus is in the halted state, based on the length of time of shift from acceleration to reverse acceleration and thence to the next acceleration, and setting the velocity during this time duration unanimously to zero. Alternatively, the apparatus is desirably provided with the function of correcting the point of origin when the image shift is noticeable to the observer. Still alternatively, the velocity re-setting operation is desirably carried out so that the movement of the image information displaying apparatus during halting will be zero.

There are also occasions where intermittent acceleration and deceleration are repeatedly produced due to hand-shake during the halt state due to habits of a user. These habits of the user may be registered as the pattern proper to the user in the image information displaying apparatus 101 in order to perform movement control so that the movement caused thereby will be canceled.

Meanwhile, if, as the mode changeover switch 108 is in the pressed state, the user has moved the image information displaying apparatus 101 in a preset direction, the image information 266, read out from the display memory area 253, is not varied but remains fixed. When the pressing on the mode changeover switch 108 is removed, the user is able to acquire again the image display effect coincident with the movement direction of the image information displaying apparatus 101, as if the liquid crystal display 104 is a peeping window to the virtual space. Thus, if the portal of the D-University is first demonstrated on the liquid crystal display 104, such operations may be executed that each laboratory ward, library or caf can be displayed, as the image information displaying apparatus 101 is moved along the direction of the road emanating from the portal and, if the destination is not found, the road is retraced back to the portal, whereby the entire contents displayed on the map can be comprehended more promptly. In addition, by carrying out the operation of moving the image information displaying apparatus 101, the image information that can be demonstrated on the liquid crystal display 104 can be shifted in an amount corresponding to the movement of the image information displaying apparatus 101 which is carried out as the mode changeover switch 108 is pressed.

The foregoing description refers to the two-dimensional map or image information. The present invention is, however, applicable to the three-dimensional map or image information. For example, on arrival at the inner space of a laboratory ward by movement from the portal of the D-University in substantially the horizontal direction (X- and Y-direction), the image information displaying apparatus 101 may be moved along the Z-direction to display the layout of each floor of the laboratory ward. In this case, the position sensor 109 detects the spatial movement of the image information displaying apparatus 102 as being the movement on the three-dimensional coordinate system. It is noted that, in the human brain, the two-dimensional map information can be comprehended along the horizontal direction, vertical direction or other directions, within the perceptual space 141 (FIG. 2). Thus, in the present embodiment, the direction of the two-dimensional map, demonstrated on the image information displaying apparatus 101, that is the direction corresponding to the horizontal plane or the direction corresponding to the vertical plane, may be selected depending on the direction of movement of the apparatus 101.

In the above-described embodiment, the position sensor 109 used is the acceleration sensor. Alternatively, the sensors having similar functions may be formed using various devices different than the acceleration sensor. For example, a mark or a light emitter, indicating a reference point, may be mounted on e.g., the breast or neck part of the apparel of the user of the image information displaying apparatus 101, in which case the position of the reference point may be detected, using a device such as PSD (position sensitive device), built into the main body unit of the apparatus 102 from the outset, to find the position of the display image frame by reverse operations. It is also possible to have an imaging camera built in the main body unit of the apparatus and to find the direction and the magnitude of movement of the image information displaying apparatus 101 from the state of movement of the image of the captured surrounding object. It is moreover possible to detect the position with the upper body of the user as a reference. Among the methods for position detection, there are, for example, (1) a method for detecting the position of a reference light emitting point, affixed to the user's upper body, and (2) a method for imaging the surface of the upper body to detect the position of the display position, based on changes in the photographed image. It is also possible to calculate the position variations by the correlation calculations of the one-dimensional image information acquired every preset time interval by two one-dimensional image sensors arranged at right angles to each other. A movement sensor employing e.g. speckles belongs to this class of the position sensor.

It is also possible to detect changes in the image information displaying apparatus 101 by the user based on simple changes in an external image. However, if the user is on board an electric rolling stock, a taxi or the like transport facilities, there results detection as if the image information displaying apparatus 101 is moving, even though it is at a standstill, unless changes in the image attendant on the movement of objects other than the user are canceled.

Thus, a technique of detecting the distance from a fixed object, such as floor, ceiling or wall, using a distance detection unit, such as an optical distance detection unit or an ultrasonic distance detection unit, and to detect the movement of the image information displaying apparatus 101, is effective. In manipulating the image information displaying apparatus 101, the floor or the ground surface may be fluctuated, as an image, by physical characteristics, such as stature, of the user. However, these fluctuations may be sufficiently reduced because the apparatus is handled by the same user. Thus, the position detection of the up-and-down direction of the perceptual space 141 (vertical direction of the display, such as the liquid crystal display) may be carried out in stability. Meanwhile, if the shift of the point of origin is at issue with this technique, it is sufficient to make necessary corrections using the mode changeover switch 108 as explained in the above-described embodiment.

For an optical distance detection unit, such a technique consisting in projecting light on an object of measurement to detect the position of a luminous point to find the distance based on the principle of triangulation, such as in the principle used for distance detection for an automatic focusing camera, is simple and effective. For an ultrasonic distance detection unit, the time-of-flight method, measuring the distance based on time until the radiated ultrasonic wave is returned after reflection on the object being measured, is beneficial in achieving stabilized results.

In the above-described embodiment, the image information is acquired using the Internet. Of course, the similar image information may also be acquired using other communication networks, such as LAN (Local Area Network), from a computer, or using other recording mediums, such as CD (Compact Disc) or DVD (Digital Video Disc), with the aid of a preset connection cable.

The relationship of correspondence between the elements indicated in the claims and the aforementioned embodiment is now explained. The image information storage unit, display image range selection unit, partial image information selection controller, movement stop time period decision unit and the displacement correction unit represent the structures of functional blocks. Specifically, the image information storage unit is constituted by a RAM 155. The functions of the display image range selection unit, partial image information selection controller, movement stop time period decision unit and the displacement correction unit are implemented by the CPU 151, the display controller 157, the base address register 251 included in the display controller 157, and the display address counter 252, based on the software program stored in a memory, such as ROM 154. It is sufficient that these functional blocks are present as functions and are not limited to a specified hardware program. The functional blocks may be implemented by any suitable configuration based on the foregoing description.

It should be noted that the description of the embodiments is merely exemplary and are not intended to represent the structure essential to the present invention. The structure of the respective components are not limited to that described above and may be replaced by other suitable components provided that the purport of the invention may thereby be achieved. For example, as the display unit, any suitable means, such as CRT or printer, may be used in addition to the liquid crystal display.

A second embodiment of a display apparatus 101 of the present invention is now explained with reference to FIGS. 12 to 16. Meanwhile, in the explanation of the present embodiment, the structure used common in the above-described first embodiment are depicted by the same reference numerals and the corresponding description is omitted for clarity.

This display apparatus 101 includes a main body unit 102 as a casing. The main body unit is of a size that it can be manipulated in a hand-held state. Within the main body unit 102, there are provided, as main components, the liquid crystal display 104 as a display unit, the position sensor 109, as position detection unit, a stereoscopic model information storage unit 300, having stored therein the stereoscopic model information, a two-dimensional image information outputting unit 310 for varying the observing point in agreement with the movement of the casing as detected by the position sensor to generate and output the two-dimensional image information derived from the varied observing point, and a display image range selection unit 320 for selecting the partial image information of a display range that can be demonstrated at a time on the display unit (see FIG. 12).

Specifically, the stereoscopic model information storage unit 300 is mounted using a portion of the storage area of the RAM 155. The stereoscopic model information, stored in the RAM 155, is represented by techniques such as polygon model, NURBS (Non-Uniform Rational B-Spline) or voxel. There is no particular limitation to the representing methods, it being only sufficient that the stereoscopic model may thereby be represented.

The two-dimensional image information outputting unit 310 effectuates perspective transformation from a stereoscopic model at a moved observing point to acquire two-dimensional data, for example, bit map data, as raster data. The resulting data are written in an optional area of the RAM 155. This operation is sometimes called rendering. In the present embodiment, the two-dimensional image information outputting unit 310 generates and outputs an image for a right eye 331 and an image for a left eye 332 for stereoscopy (see FIG. 13). For producing these images 331, 332, it is sufficient to generate images from two observing points corresponding to the left and right eyes.

The display image range selection unit 320 is basically the same as that of the first embodiment. In sum, the image of an area that can be demonstrated on the display 104 is selected from the two-dimensional image generated by the two-dimensional image information outputting unit 310.

Figure 14A:
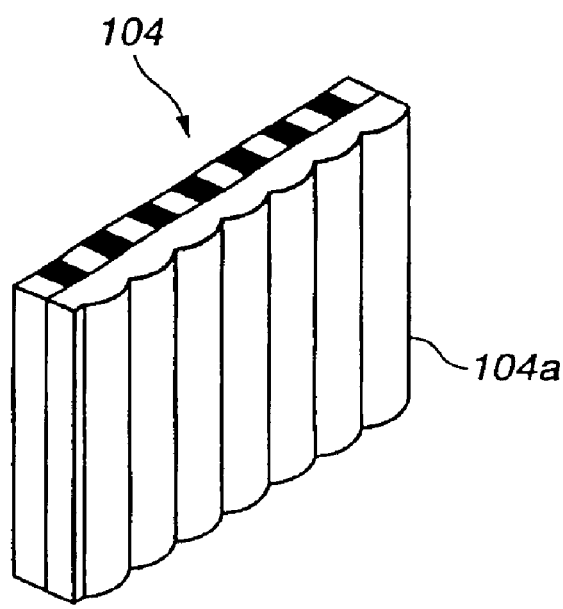
FIGS. 14a and 14b are a perspective view and a plan view, respectively, showing an illustrative structure of a display unit used in the second embodiment of the present invention.
Figure 14B:
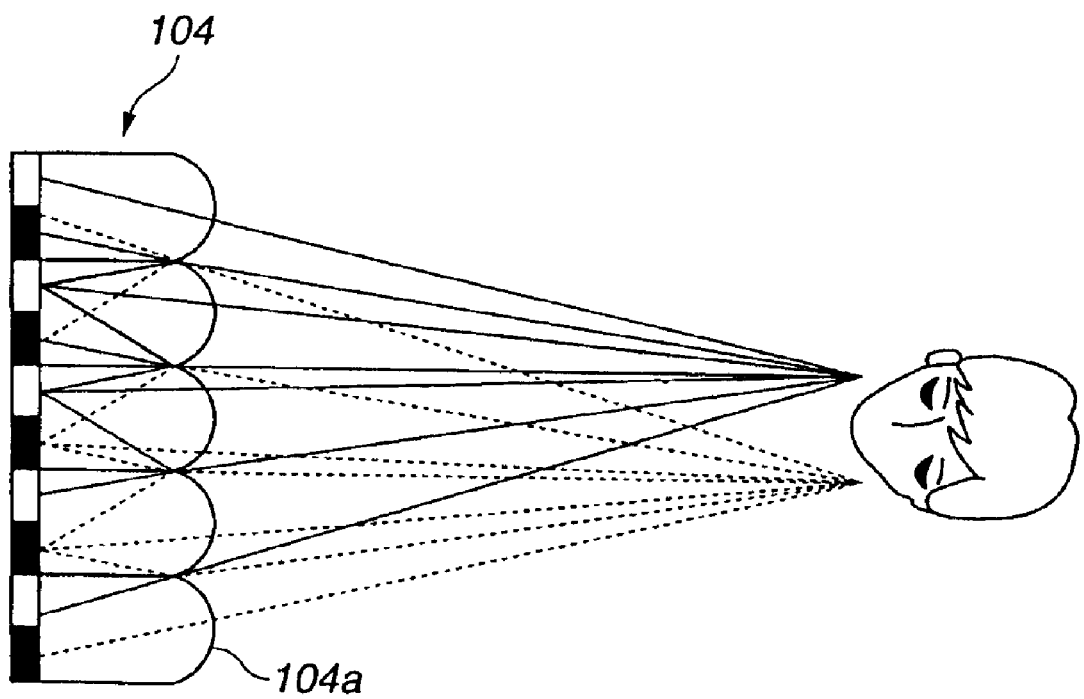

The structure of the display 104 in the second embodiment is shown in FIG. 14. In the display 104, the image for the right eye and the image for the left eye, each of a preset width, are alternately demonstrated in a display area. In FIG. 14, the image for the right eye and the image for the left eye are indicated with a white color and with a black color, respectively. A lenticular screen 104a is mounted on the front surface of the display. The lenticular screen 104a has numerous ribs, each exhibiting the action of a lens, and each being provided in keeping with the image width.

If this display 104 is used, the image for the right eye is observed only with the right eye, while the image for the left eye is observed only with the left eye, so that stereoscopy may be achieved. If the same image is used for the right eye and the image for the left eye, plano-scopy may be achieved. The lenticular screen 104a is of the well-known technique and hence is not explained in detail.

Figure 15:
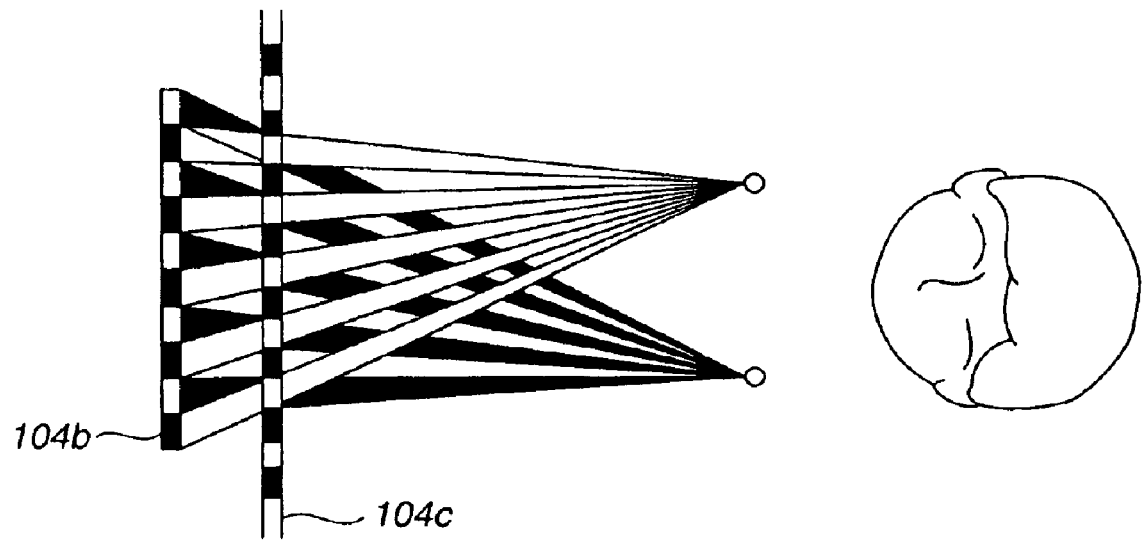
FIG. 15 shows another example of a display unit used in the second embodiment of the present invention.
Figure 16:
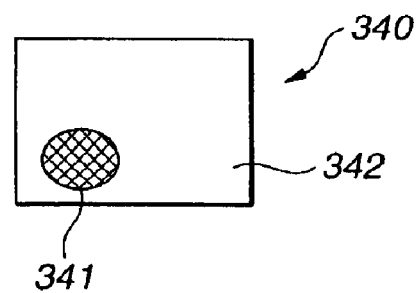
FIG. 16 illustrates an example of a display technique of a stereoscopic shape.

FIG. 15 shows a modification of the display 104. In this modification, the images for the right eye and the images for the left eye are arrayed alternately in a stereoscopic image display surface 104b of the display 104. In FIG. 15, the display positions for the right image are indicated in black, while those for the left eye are indicated in white. On the front side of the stereoscopic image display surface 104b is arranged a slit barrier 104c, which slit barrier 104c includes an alternate array of openings (apertures) and light interrupting portions, indicated in black in the drawing. The image is viewed through the openings to achieve the stereoscopy. This method is not explained in detail because it is well-known as a parallax stereogram. For other stereoscopic methods, the anaglyph, for example, may be used.

It is now assumed that a given image 340 (see FIG. 16) includes an area 341 representing a stereoscopic shape and the planar background 342. In such case, only the area 341 representing the stereoscopic shape may be generated and displayed by the method of the second embodiment, with the background 342 being generated and represented by the method of the first embodiment. In this case, image synthesis is needed. Since the technique for image synthesis is well-known, it is not explained in detail.

Of course, the two-dimensional image information outputting unit 310 in the second embodiment may be configured for generating an ordinary two-dimensional image instead of a stereoscopic image.

INDUSTRIAL APPLICABILITY

The partial image information is selected and displayed on the display unit accommodated in a predetermined casing of a size large enough to permit manual operation, and the display contents are moved, so that, by actively moving the image information displaying apparatus, the image can be changed correspondingly, such that, even if only a portion of the image can be displayed, the entire image can be comprehended or necessary partial images can be displayed extremely readily. Moreover, since it is unnecessary to manipulate the image information displaying apparatus on the desk, image display control can be performed irrespective of the location in which the apparatus is manipulated. Additionally, in a manner different from the case in which the apparatus is manipulated on the desk, the position movement for causing movement of the image demonstrated on the display unit may be matched to the movement in the perceptual space delineated by the human brain, thus assuring facilitated correct image recognition.

According to one aspect of the invention, the partial image information selection controller causes two-dimensional movement of the image selected by the display image range selection unit, in association with the two-dimensional movement, thus assuring facilitated image recognition. Moreover, the information other than the two-dimensional movement in the three-dimensional movement as detected by the position detection unit may be eliminated. Thus, the information different than the two-dimensional movement, such as the movement of approaching an eye to the image demonstrated on the image information displaying apparatus, may be discounted, with the image display contents not being changed, thus achieving image recognition by spontaneous image enlargement caused by the approaching eye. In this meaning, it is possible to avoid the risk of the user of the image information displaying apparatus reaching mistaken results of recognition through mistaken image recognition.

According to another aspect of the invention, in which, in the image information displaying, the position sensor detects the movement by substituting three-dimensional movement for spatial movement of the casing, and in which the partial image information selection controller moves the image selected by the display image range selection unit in relationship to the substituted three-dimensional movement, the three-dimensional image information can be comprehended intuitively. Consequently, the analysis of the structure of each floor of a building or the cross-section of the brain can be achieved intuitively.

According to another aspect of the invention, in which the image information storage unit stores the image information downloaded over a communication network, a large variety of the image information, premised on the use of an ordinary desktop type computer, may be received by exploiting the features of the present image information displaying apparatus capable of readily grasping the large size image. Consequently, there is no necessity for the information purveyor to provide two types of the image information, namely the image information for the usual desktop computer and that for the portable telephone set. On the other hand, the problem of deteriorated resolution caused in providing the image for the image information displaying apparatus with a small sized display image frame, such as a portable telephone set, may be eliminated.

According to another aspect of the invention, in which apparent movement of the position sensor, produced when the user halts the movement of the image information displaying apparatus, may be discounted, so that the display position can be maintained accurately at all times.

The invention claimed is:

1. An image information displaying apparatus comprising:
a casing of a size that can be held and operated by hand, said casing having a horizontal orientation and a vertical orientation;
a display unit built into said casing for displaying an image;
a two-dimension position sensor for detecting a direction and a distance when said casing is moved in an XY-plane;
an image information storage unit for storing the image information of an image size larger than an image size that permits display at a time on said display unit;
a display image range selection unit for selecting a partial image information of a display range that can be displayed at a time, from the image information stored in said image information storage unit, and for outputting the selected information to said display unit for display; and
a partial image information selection controller for moving the image selected by said display image range selection unit according to the direction and the distance of the casing movement as selected by said two-dimension position sensor,
wherein the partial image information selection controller detects movement of the casing along a Z-axis perpendicular to the XY plane of the casing such that, when the casing is in the horizontal orientation, movement of the casing along the Z-axis causes movement of the displayed image along a height of the image information, and when the casing is held in the vertical orientation, movement of the casing along the Z-axis causes movement of the displayed image along a cross-section of the image information.

2. The image information displaying apparatus according to claim 1 wherein said two-dimension position sensor detects the movement by substituting two-dimensional movement for spatial movement of said casing, and wherein said partial image information selection controller moves the image selected by said display image range selection unit in relationship to the substituted two-dimensional movement.

3. The image information displaying apparatus according to claim 1 wherein said two-dimension position sensor detects the movement by substituting three-dimensional movement for spatial movement of said casing, and wherein said partial image information selection controller moves the image selected by said display image range selection unit in relationship to the substituted three-dimensional movement.

4. The image information displaying apparatus according to claim 1 wherein said image information storage unit stores the image information downloaded over a communication network.

5. The image information displaying apparatus according to claim 1 wherein said partial image information selection controller includes a point of origin coordinate data registration unit for registering the coordinate of a point of origin serving as a reference for a display frame in slicing a portion of the image information stored in said image information storage unit to said display unit for display thereon, and a selection instructing unit for causing said display image range selection unit to select sequentially the display range of the partial image determined by said display frame by sequentially changing the coordinate of said point of origin in relationship to the direction and the magnitude of spatial movement of said casing as detected by said two-dimension position sensor.

6. The image information displaying apparatus according to claim 1 further comprising a switch for on/off setting as to whether or not the spatial movement of said casing sequentially detected by said two-dimension position sensor is to be reflected in registered contents of said point of origin coordinate data registration unit.

7. The image information displaying apparatus according to claim 1 wherein said image information storage unit is a memory in a computer.

8. The image information displaying apparatus according to claim 1 wherein said display image range selection unit is implemented by a CPU and a memory in a computer and the functions of a computer software stored in said memory.

9. The image information displaying apparatus according to claim 1 wherein said partial image information selection controller is implemented by a CPU and a memory in a computer and the functions of a computer software stored in said memory.

10. An image information displaying apparatus comprising:
a casing of a size that can be held and operated by hand, said casing having a horizontal orientation and a vertical orientation;
a display unit built into said casing for displaying an image;
a two-dimension position sensor for detecting a direction and a distance when the casing is moved;
a stereoscopic model information storage unit having the stereoscopic model information stored therein;
a two-dimensional image information outputting unit for changing an observing point in keeping with movement of said casing as detected by said two-dimension position sensor to generate and output the two-dimensional image information from the stereoscopic model, wherein the two-dimensional image information is based on the changed viewing point; and
a display image range selection unit for selecting partial image information from the two-dimensional image information and outputting the selected partial image information to the display unit, wherein the partial image information is displayed at a time on said display unit,
wherein the partial image information selection controller detects movement of the casing along a Z-axis perpendicular to the XY plane of the casing such that,
when the casing is in the horizontal orientation, movement of the casing along the Z-axis causes movement of the displayed image along a height of the image information, and
when the casing is held in the vertical orientation, movement of the casing along the Z-axis causes movement of the displayed image along a cross-section of the image information.

11. The image information displaying apparatus according to claim 10 wherein said two-dimensional image information outputting unit generates and outputs an image for a right eye and an image for a left eye for stereoscopy and wherein said display unit displays said image for a right eye and the image for a left eye in such a manner as to enable stereoscopy.

12. The apparatus of claim 1, wherein the image information storage unit stores partial images of an unknown image of a larger size than the display unit, and wherein the display range image selection unit selects the partial images in a sequence such that the unknown image is assembled from the partial images in accordance with movement of the case.

13. The apparatus of claim 10, wherein the image information storage unit stores partial images of an unknown image of a larger size than the display unit, and wherein the display range image selection unit selects the partial images in a sequence such that the unknown image is assembled from the partial images in accordance with movement of the case.

* * * * *